(12) United States Patent
Prigge et al.

(10) Patent No.: US 11,660,559 B2
(45) Date of Patent: May 30, 2023

(54) FILTER LIFE PREDICTION METHOD AND FILTER TYPE DETECTION METHOD

(71) Applicant: Vitality Ventures HK Company Limited, Mill Valley, CA (US)

(72) Inventors: Grant Prigge, Belvedere-Tiburon, CA (US); Yordan Konstantinov Kralev, Sofia (BG)

(73) Assignee: Vitality Ventures HK Company Limited, Mill Valley, CA (US)

( * ) Notice: Subject to any disclaimer, the term of this patent is extended or adjusted under 35 U.S.C. 154(b) by 313 days.

(21) Appl. No.: 16/895,538

(22) Filed: Jun. 8, 2020

(65) Prior Publication Data

US 2021/0379520 A1    Dec. 9, 2021

(51) Int. Cl.

| | |
|---|---|
| *B01D 46/00* | (2022.01) |
| *F24F 11/39* | (2018.01) |
| *F24F 11/52* | (2018.01) |
| *F24F 8/10* | (2021.01) |
| *B01D 46/42* | (2006.01) |
| *F24F 110/30* | (2018.01) |
| *F24F 110/40* | (2018.01) |

(52) U.S. Cl.
CPC ....... *B01D 46/0086* (2013.01); *B01D 46/009* (2013.01); *B01D 46/42* (2013.01); *F24F 8/10* (2021.01); *F24F 11/39* (2018.01); *F24F 11/52* (2018.01); *F24F 2110/30* (2018.01); *F24F 2110/40* (2018.01)

(58) Field of Classification Search
CPC .. B01D 46/0086; B01D 46/009; B01D 46/42; F24F 1/39; F24F 1/52; F24F 8/10; F24F 2110/30; F24F 2110/40
See application file for complete search history.

(56) References Cited

U.S. PATENT DOCUMENTS

| | | | |
|---|---|---|---|
| 2005/0247194 A1* | 11/2005 | Kang | B01D 46/444 95/25 |
| 2013/0103352 A1* | 4/2013 | ter Horst | G01N 15/0826 702/182 |
| 2014/0260996 A1* | 9/2014 | Grider | B01D 46/446 96/402 |
| 2017/0098230 A1* | 4/2017 | Orangkhadivi | G06Q 10/083 |
| 2021/0207833 A1* | 7/2021 | Dameno | F24F 11/46 |

* cited by examiner

*Primary Examiner* — Marc E Norman
(74) *Attorney, Agent, or Firm* — Hammer & Associates, P.C.

(57) ABSTRACT

A method to predict the lifespan of an air filter including providing pressure sensors in a device having an air filter and a fan to drive air through the air filter, one pressure sensor located on an intake side of the fan and one pressure sensor located on an outflow side of the fan, periodically calculating a static pressure drop across the fan, storing the static pressure drop daily; calculating an average pressure drop, calculating a cumulative particle loading on the filter, comparing the cumulative particle loading with a pre-determined maximum particle loading for the filter, and determining if the filter needs to be changed is provided.

5 Claims, 3 Drawing Sheets

FILTER LIFE PREDICTION METHOD AND FILTER TYPE DETECTION METHOD

FIELD OF THE INVENTION

The invention relates to a method for predicting the lifespan of an air filter, a method to determine the type of filter in a device and devices utilizing the method.

BACKGROUND OF THE INVENTION

The growing effect of pollution and global warming are increasing the need for air purifiers. These products use a filtration media, such as high-efficiency particulate air (HEPA) filters, to remove harmful airborne particulates from the air. The efficiency of the air purifier ultimately rests with cleanliness of the filter.

The standard method most manufacturers use to indicate filter cleanliness and remaining life, is by a simple timer function. This just counts the hours of operation the filter has been in use and alerts the user when some predetermined limit is reached. The problem with this method is that "time" is only one indicator of filter loading. For example, you can place one device in a pharmaceutical-grade clean room and the other in an airport smoking lounge and they would both indicate a filter change is required after the same time of usage.

Manometers are used to measure the static pressure drop of filters within a home or office central HVAC system. Such instruments are common in the commercial HVAC industry. However, manometers are expensive instruments designed for use by trained technicians. Therefore, manometers are not considered applicable for low cost consumer appliances.

Prior studies have shown the mass loading capacity of HEPA filters; accumulated mass being between 50 to 300 g/m$^2$ at a pressure drop of 5 kPa and a flow velocity of 3.2 cm/s through a filter having a 14 m$^2$ filter area. Such studies were conducted with calibrated test aerosols or particulate matter. Generally, filters with deeper or wider pleats carry more particle loading than filters with smaller or narrower pleats. It has been observed that with smaller pleats, filtered particles rapidly fill the channels between pleats, effectively reducing the available filtration area. Moreover, large differences in mass loading can be observed as a function of particle diameter.

When there is significant particle mass loading on a HEPA filter, the pressure drop across the filter is a sum of pressure drop of the clean filter areas and the pressure drop across the highly loaded areas of the filter. The high collection efficiency of HEPA filters causes a particle cake to form on the front surface of the filter, which faces the air intake. The gas flow through the filter is assumed to be laminar or without vortices, which guarantees a linear increase of the pressure drop with the increase of the flow velocity. The proportionality gain between pressure and flow rate depends on the filter media parameters such as overall filter size, filter porosity and thickness.

Several models for predicting the pressure drop due to mass loading exist:
- The pressure decrease across the particle cake can be derived from the pressure decrease due to the drag force across all of the particle diameters. The distribution is assumed to be monodisperse, i.e. only one averaged particle size to simplify the model;
- Models related to fiber density and fiber diameter;
- Semi-empirical equations that determine the resistance factor as a function of the cake porosity. Alternative definition of the resistance can be obtained from the various analytical approximations related to porosity. The cake porosity can only be determined with experimental measurements of the thickness of the deposited cake and the total mass of particles in the cake. Such measurements are subjected to large statistical errors.

SUMMARY OF THE INVENTION

A first embodiment of the invention provides a method to predict the lifespan of an air filter comprising the steps of providing pressure sensors in a device having an air filter and a fan to drive air through the air filter, wherein one pressure sensor is located on an intake side of the fan and one pressure sensor is located on an outflow side of the fan, and a static pressure drop is calculated periodically from measurements obtained by the pressure sensors; storing the static pressure drop on a daily basis over a period of days; calculating an average pressure drop from the stored static pressure drop information; calculating a cumulative particle loading on the filter; comparing the cumulative particle loading with a pre-determined maximum particle loading for the filter; if the cumulative particle loading is greater than the maximum particle loading, then indicating through the user interface that the filter should be changed; if the cumulative particle loading is less than the maximum particle loading, calculating the days of life of the filter remaining.

BRIEF DESCRIPTION OF THE DRAWINGS

The accompanying drawings, which are incorporated herein and constitute part of this specification, illustrate exemplary embodiments of the invention, and together with the general and detailed description given herein, serve to explain the features of the invention.

DETAILED DESCRIPTION OF THE INVENTION

The invention provides a control system and method to estimate filter loading with micrometer range particles by analyzing the pressure drop dynamics during filter operation over a long period of time. Using the data gathered over time, the available filter capacity is estimated and expressed to the user as days of filter life remaining.

Figure 1:
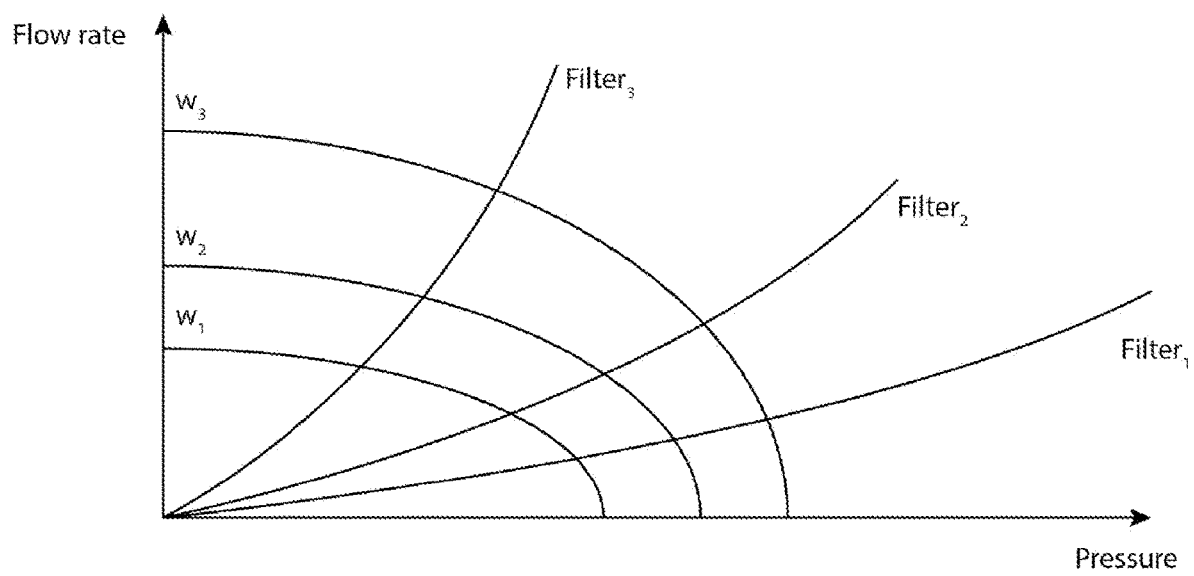
FIG. 1 is a graph illustrating Pressure/Flow curves for three different filters and for different fan motors.

The control system includes pre-programmed information, in the form of look up tables, on the pressure/flow curves of a variety of filters. The control system further includes date on the flow rate versus pressure for low, medium and high fan speeds for the fan used in the device. See FIG. 1, wherein w1 is motor curve at low fan speed, w2 is the motor curve at medium fan speed, and w3 is the motor curve at high fan speed. Cures for three different types of filters are also shown in FIG. 1. The intersection between the filter curves and motor curve represents the operating point and defines the instantaneous pressure and flow values.

As an initial step in the inventive method, the control system recognizes a filter change by a sensor on a filter bay door indicating that the filter bay door has been opened.

Alternatively, a user may manually indicate a filter change by way of the user interface. Upon installation of a new filter, the control system may automatically detect the type of filter installed by measuring the pressure drop across the filter using a specific fan velocity and initial air flow and by comparing such measurements with pressure flow data for a variety of filter types stored in the control system. The filter type detection process is based on comparing the pressure-flow curve obtained during a self-calibration process where a stairwise identification speed pattern is applied and pressure drop is stored together with the estimated flow rate levels and the information is stored in a look-up table. When this table is compared with the set of predefined filter characteristics the best possible match is selected based on L1 Norm criteria. The problem with filter detection is that if two filter models have close pressure-flow characteristics they cannot readily be discriminated against one another. Therefore, the filter detection method may need confirmation or assistance from the user. The control system may, in certain embodiments, display the type of filter on the user interface and prompt the user to confirm or deny whether the control system has correctly identified the filter type.

Figure 2:
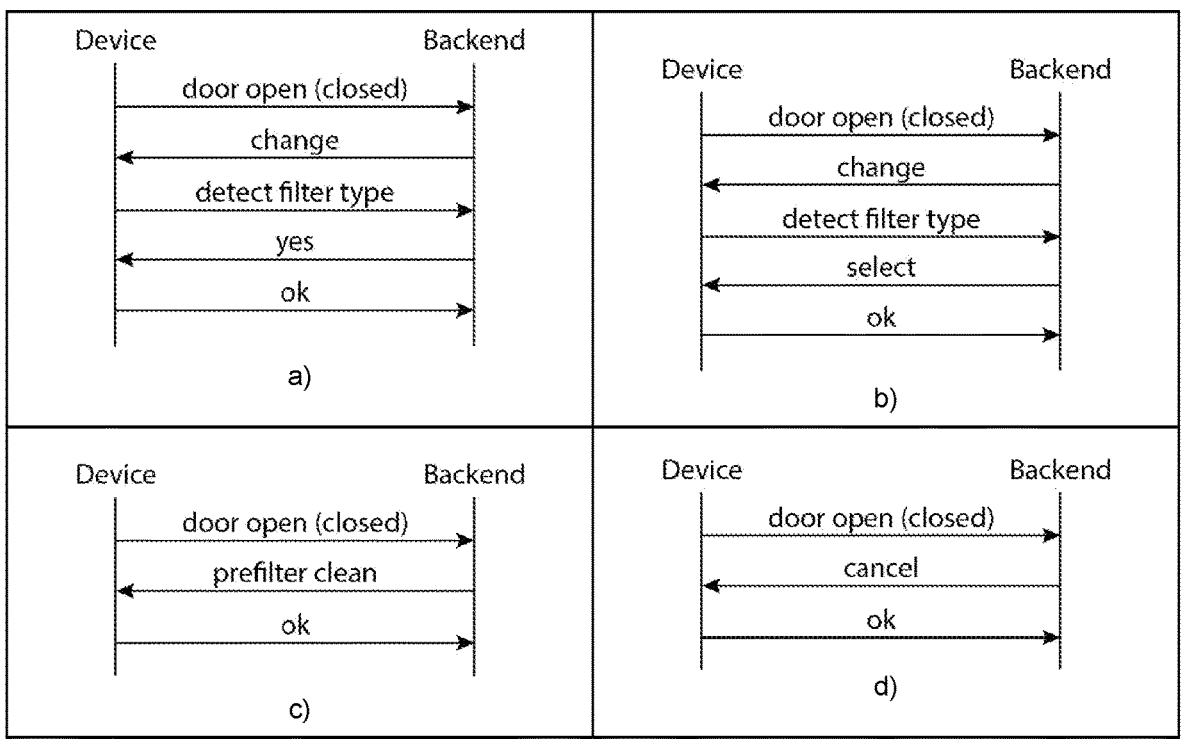
FIG. 2 schematically illustrates a new filter type identification decision tree utilized in one embodiment of the invention.

A dedicated filter change protocol in the control system is designed to guide the user during the process. FIG. 2 illustrates the four recognized scenarios for detection and identification of the newly installed filter type. Referring to FIG. 2 (a), in automatic filter detection, after the end-user confirms that the filter is changed, the control system activates the fan, and measures the pressure on the outflow side of the filter at a variety of fan speeds, i.e., air flow rates. By comparing these measurements with stored information in a look up table, the control system determines the type of filter installed. In a manual mode, a user is permitted to enter a filter type by way of the user interface. See FIG. 2 (b). The end-user may accept or reject the proposed filter type and select the filter type by manual selection. Alternatively, the user may indicate that a new filter has not been installed even though the filter bay door has been opened and closed. See FIG. 2 (c) & (d) indicating that only the pre-filter has been cleaned or the filter bay door opened and closed for no reason or by accident. The pre-filter is a manually cleanable part of the filter system and is used to remove large, i.e., particles equal to or greater than 10 microns, particles prior to the air passing through the HEPA filter.

Following installation of a new filter and determination of the filter type, a filter life prediction protocol is engaged by periodic monitoring of a number of device properties by way of sensors. Pressure drop is directly measured with Micro-ElectroMechanical Systems ("MEMS") sensors located before and after the filter. However due to absolute tolerances in the sensor characteristics both sensor measurements experience systematic bias even at ambient pressure and when calibrated with respect to humidity and temperature. In addition, there is no guarantee that this bias will not vary with flow rate and pressure. To compensate for this bias an extended Kalman filter ("EKF") is applied to estimate pressure drop, bias and pressure drop sensitivity to fan angular velocity. The filter noise variance is switched with the working conditions.

In addition to pressure drop across the filter other filter related variables are measured or estimated. Such variables include, air flow rate (which is measured), clean air delivery rate (cadr) (which is calculated), fan angular velocity (which is set or measured), filter loading with micrometer range particles (pm_loading) (determined from PM 2.5 which is measured daily using PM 2.5 sensors), maximum filter loading with micrometer range particles (max_loading) (determined from filter studies—generally, loading when filter efficiency drops by 20%), average daily particle count (total particle count divided by days), filter loading constant and days left until filter loading reaches the maximum loading. Typically, flow rate cannot be directly measured, so in order to effectively estimate the flow rate experimentally validated pressure-flow characteristics of the fan are used. Based on previously conducted test chamber experiments, a look up table is constructed with fan angular velocity and pressure drop and output, which is the flow rate.

The filter clean air delivery rate ("cadr") is defined as the flow rate multiplied by the filter efficiency. For conventional HEPA type filters, the efficiency is about 1 but for other filter types with more layers the filter efficiency drops to as low as 0.8. However, after filter loading with particles bigger than filter fibers, the pressure drop will increase due to impaired air flow through the filter. As a result, a drop in the flow rate and cadr also occurs. The filter efficiency is a structural characteristic of the filter and does not change significantly over time or with use. Rather, the drop in cadr is a good indicator of filter wear due to particle loading. Three stages of filter wear are defined: (1) the filter has low particle loading (clean state); (2) the filter particle loading is moderate and continues to increase with use (change state); and (3) the filter particle loading is close to its maximum loading (dirty state).

Figure 3:
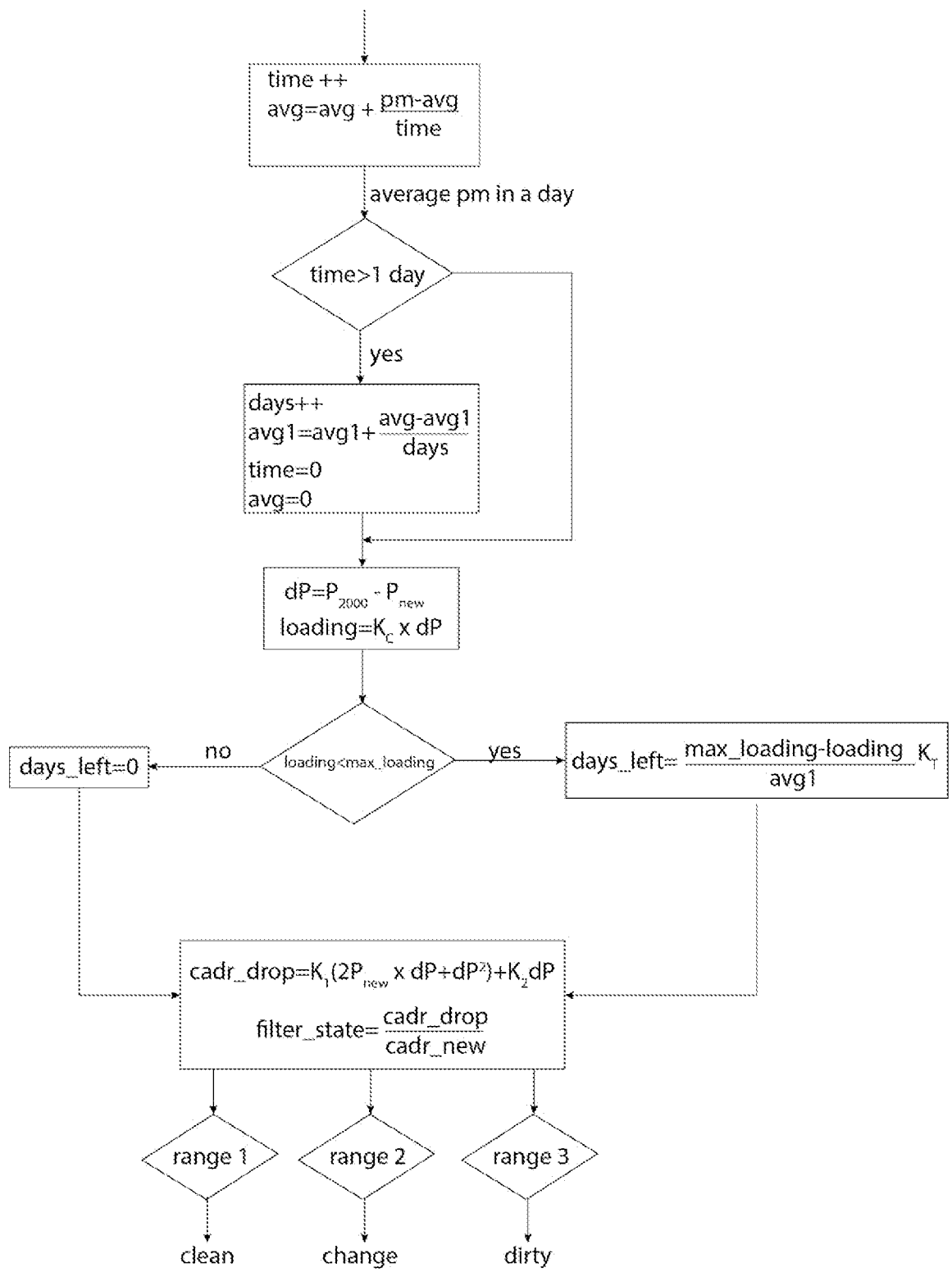
FIG. 3 is a flow diagram illustrating the method for predicting the remaining useful life of a filter.

The algorithm and method for determining the remaining filter life is illustrated in FIG. 3, wherein time is the time of the day counter, avg is the running mean of the average pm during the last day, pm is the instantaneous PM 2.5 measurement in micrograms per cubic meter, days is the number of days, avg1 is the average PM 2.5 particle loading following installation of the new filter, P_2000 signifies the last pressure drop measured at a fan speed of 2000 rpm, P_new signifies the pressure drop across the filter when it is new, loading is the mass of particles on the filter, max_loading is the maximum mass of particulates on the filter, dP is the pressure drift at 2000 rpm, Kc is a loading parameter, Kt indicates days left constant, K1 and K2 are cadr constants (which are determined through laboratory trials measuring the effect on pressure with particle loading, cadr_drop is the clean air delivery rate drop, cadr_new is the cadr value of the new filter, filter ranges 1-3 is the percentage of cadr_drop defining the filter states 1-3, as discussed above. The relationship between cadr_drop and the ranges/filter states 1-3 are pre-determined.

The process assumes that the air filter is running continuously and begins with running a mean update for the average particle density in the room during the present day. After a day elapses a running mean of daily particle density is updated. Average filter loading is calculated dividing the pressure difference between the clean and used filter at a maximum speed by the pressure loading constant, which is used to maximize the sensitivity of the method. The pressure loading constant Kc is specific to each filter type and is represented as mg/Pa. This constant is pre-determined from controlled experiments of mass loading within a controlled volume with a constant particle density. Having determined filter loading the days left are easily calculated by considering the maximum particle loading inferred from 20% drop in clean air delivery rate and average daily particle density. The drop in clean air delivery rate at maximum fan speed is calculated from the pressure difference between a new and used filter according to the pressure-flow curve of the particular fan model. The curve is approximated with a second order polynomial.

As can be seen in FIG. 3, the filter state may be determined in several different manners; (1) the number of days left until maximum loading is achieved; (2) cadr_drop; and (3) filter_state. Each of these values can be aligned with one of the ranges 1-3, wherein range 1 indicates a clean filter, range 2 indicates the filter particle loading is moderate and continues to increase with use (change state); and range 3 indicates that the filter particle loading is at or close to its maximum loading (dirty state). The range, and thus the recommended action needed by the user, may be indicated on a user interface of the device containing the air filter.

The method is primarily targeted for air-purifiers but also may be employed in any device with replaceable air filters, such as but not limited to vacuum cleaners, HVAC systems, automobile cooling and heating systems, and kitchen or bathroom venting systems. In addition, the method can discriminate between predefined filter types which are characterized by different pressure/flow curves.

We claim:

1. A method to predict the lifespan of an air filter comprising the steps of:
   providing pressure sensors in a device having an air filter and a fan to drive air through the air filter, wherein one pressure sensor is located on an intake side of the fan and one pressure sensor is located on an outflow side of the fan, and a static pressure drop is calculated periodically from measurements obtained by the pressure sensors;
   storing the static pressure drop on a daily basis over a period of days;
   calculating an average pressure drop from the stored static pressure drop information;
   calculating a cumulative particle loading on the filter;
   comparing the cumulative particle loading with a predetermined maximum particle loading for the filter;
   when the cumulative particle loading is greater than the maximum particle loading, then indicating through a user interface that the filter should be changed;
   when the cumulative particle loading is less than the maximum particle loading, (a) calculating the days of life of the filter remaining; (b) calculating a drop in the clean air delivery rate; and/or (c) calculating a filter state as the drop in clean air delivery rate divided the clean air delivery rate of a new filter.

2. The method to predict the lifespan of an air filter of claim 1, wherein the device is an air purifier.

3. The method to predict the lifespan of an air filter of claim 2, wherein the air purifier further comprises a user interface.

4. The method to predict the lifespan of an air filter of claim 3, further including displaying the filter state on the user interface.

5. The method to predict the lifespan of an air filter of claim 3, further including displaying the number of days of filter life on the user interface.

* * * * *